United States Patent [19]

Hill et al.

[11] Patent Number: 4,535,405
[45] Date of Patent: Aug. 13, 1985

[54] CONTROL AND FORCE-SENSING METHOD AND APPARATUS FOR MOTORS

[75] Inventors: John W. Hill, Palo Alto; Anthony J. Sword, San Francisco, both of Calif.

[73] Assignee: Microbot, Inc., Mountain View, Calif.

[21] Appl. No.: 426,631

[22] Filed: Sep. 29, 1982

[51] Int. Cl.³ ............................................. G05B 19/40
[52] U.S. Cl. .................. 364/400; 318/254; 318/685; 318/490; 324/158 MG; 364/556
[58] Field of Search .............. 364/140, 167, 174, 400, 364/130, 183, 571, 550, 551, 556; 318/685, 696, 490, 138, 254; 324/158 MG, 158 SM; 73/862.29, 862.32, 862.33, 862.34, 862.46

[56] References Cited

U.S. PATENT DOCUMENTS

| | | | |
|---|---|---|---|
| 3,719,878 | 3/1973 | Ferguson et al. | 318/696 X |
| 4,330,739 | 5/1982 | Chiang | 318/490 X |
| 4,362,980 | 12/1982 | Itzkowitz | 318/685 |
| 4,422,040 | 12/1983 | Raider et al. | 318/696 X |

Primary Examiner—Joseph Ruggiero
Attorney, Agent, or Firm—Limbach, Limbach & Sutton

[57] ABSTRACT

A method and apparatus for controlling a stepper motor and for force sensing and force control. Stepper motor drive waveforms are provided which are constructed of a sequence of stairsteps, the size and duration thereof being determined as a function of the desired rotational velocity of the stepper motor. Means and a method for accelerating the stepper motor by varying the step size and step duration of the stairsteps in the drive waveform are discussed. Additionally, means and a method are discussed for sensing and controlling the force applied by the stepper motor to a load by way of evaluating the displacement of the actual position of the stepper motor shaft from the commanded or desired position of the shaft. Means and a method for implementing a compliant function in a similar manner are described.

9 Claims, 15 Drawing Figures

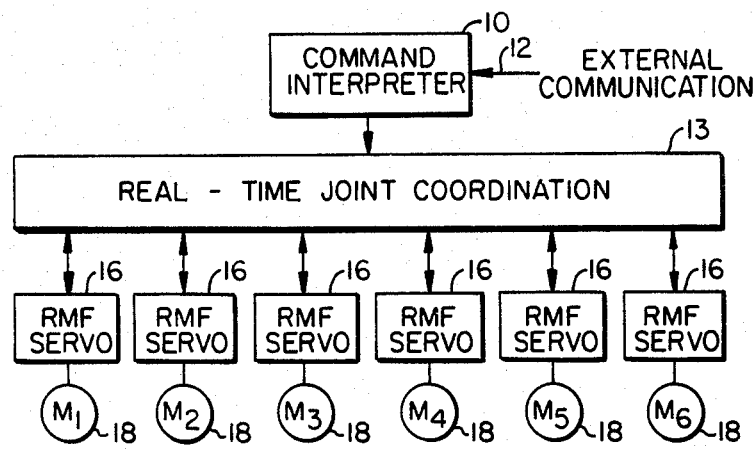
FIG._1.
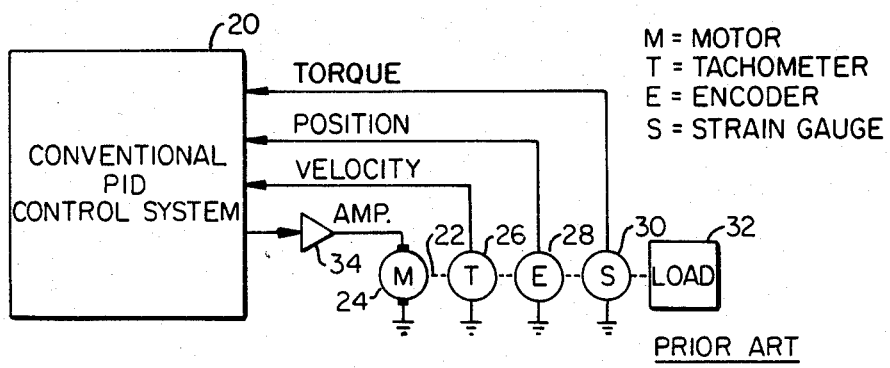
FIG._2.
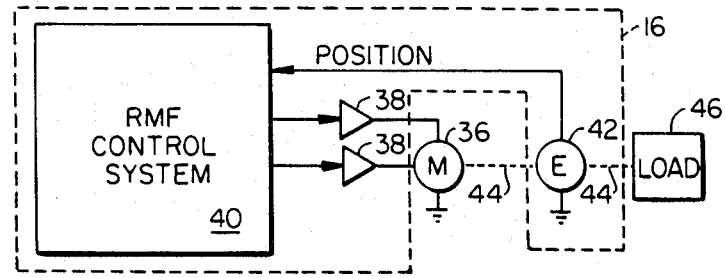
FIG._3.

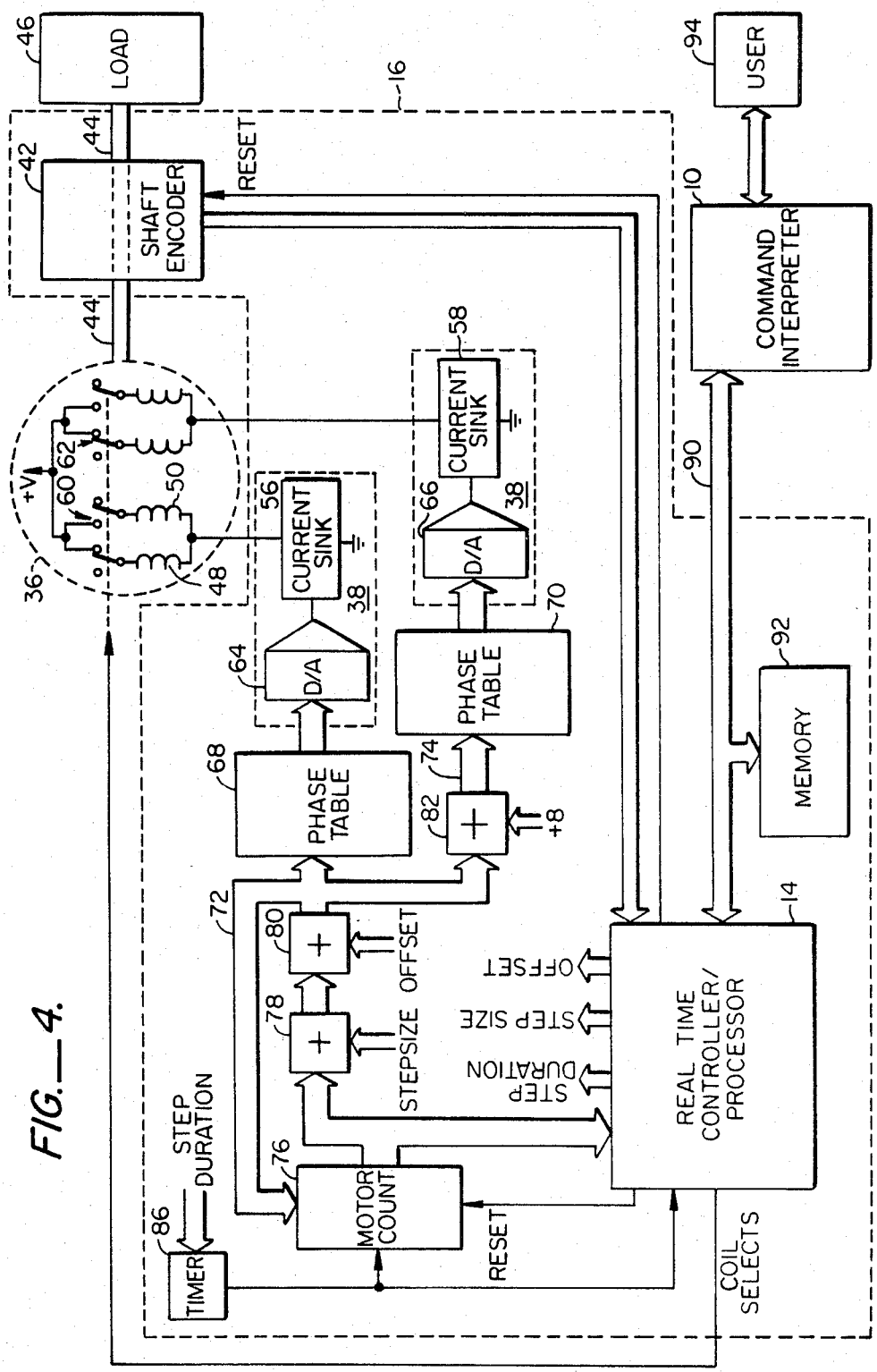
FIG._4.

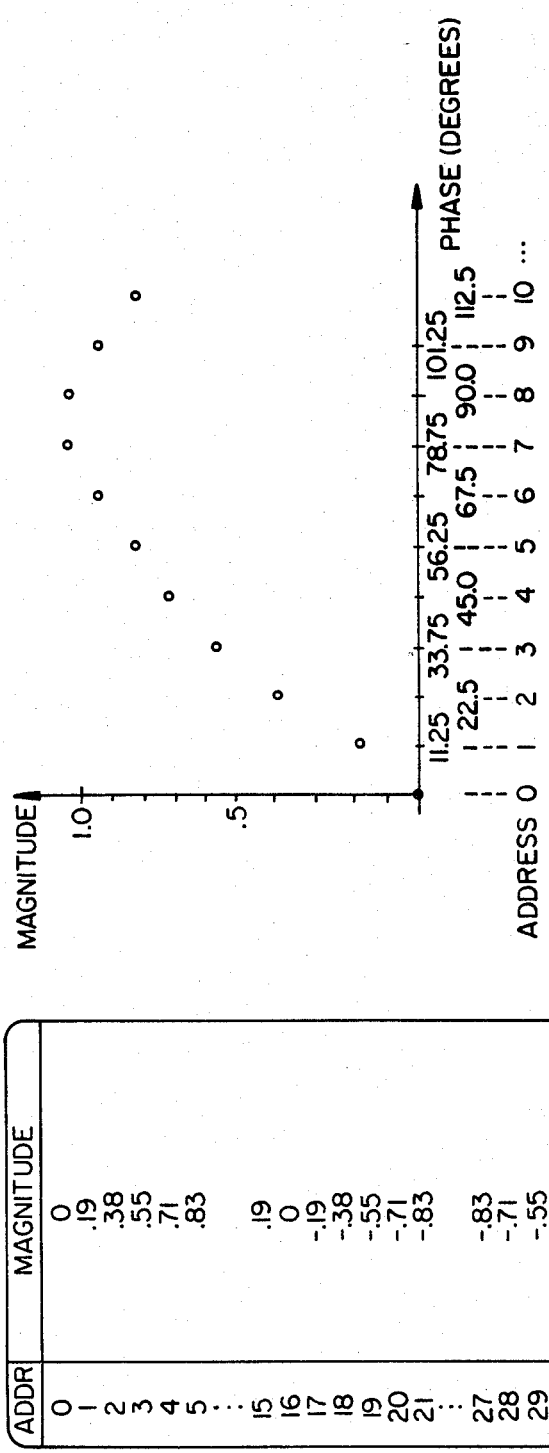
FIG._5B.
FIG._6.
FIG._5A.

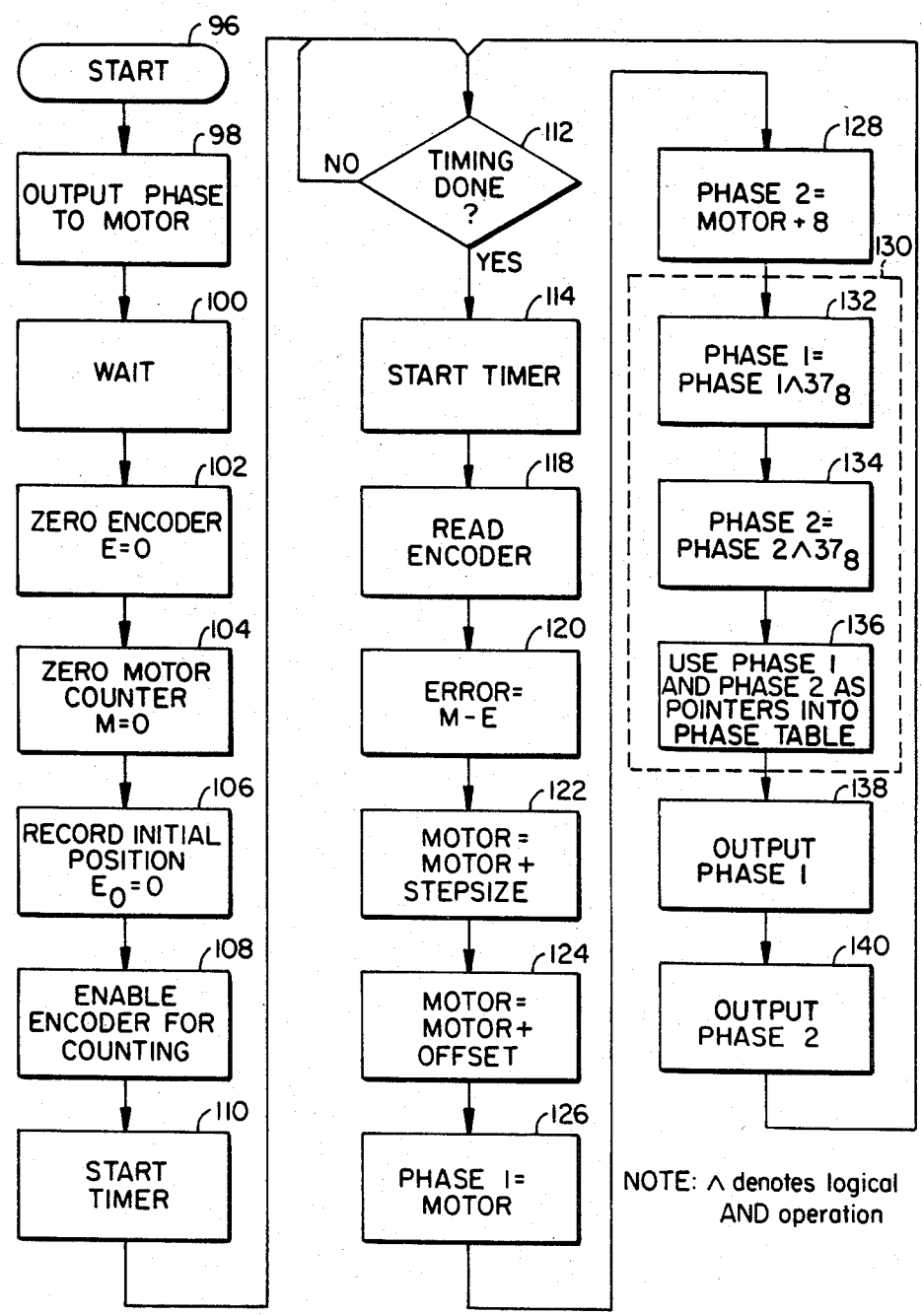
FIG._7.

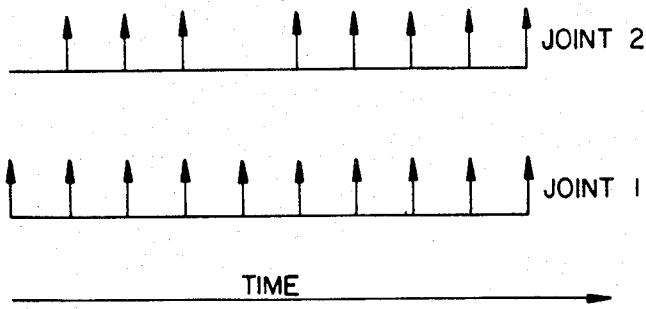
FIG._8A.
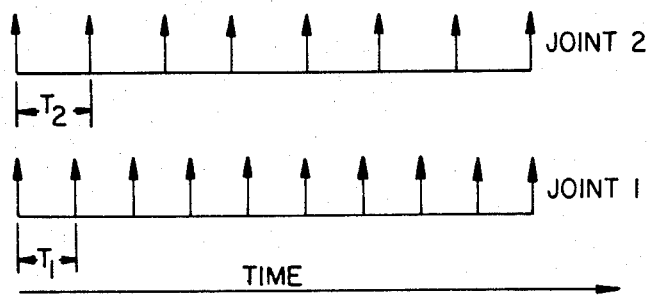
FIG._8B.
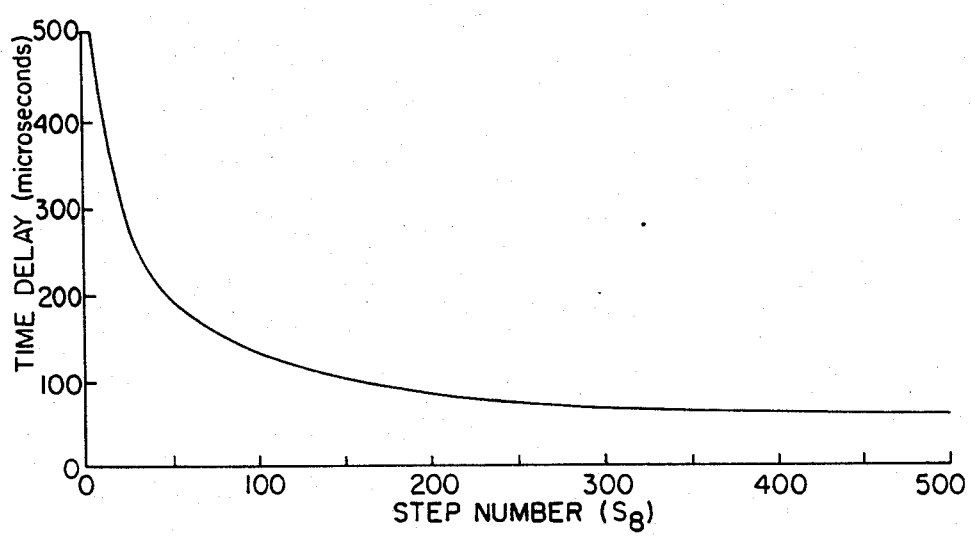
FIG._9.

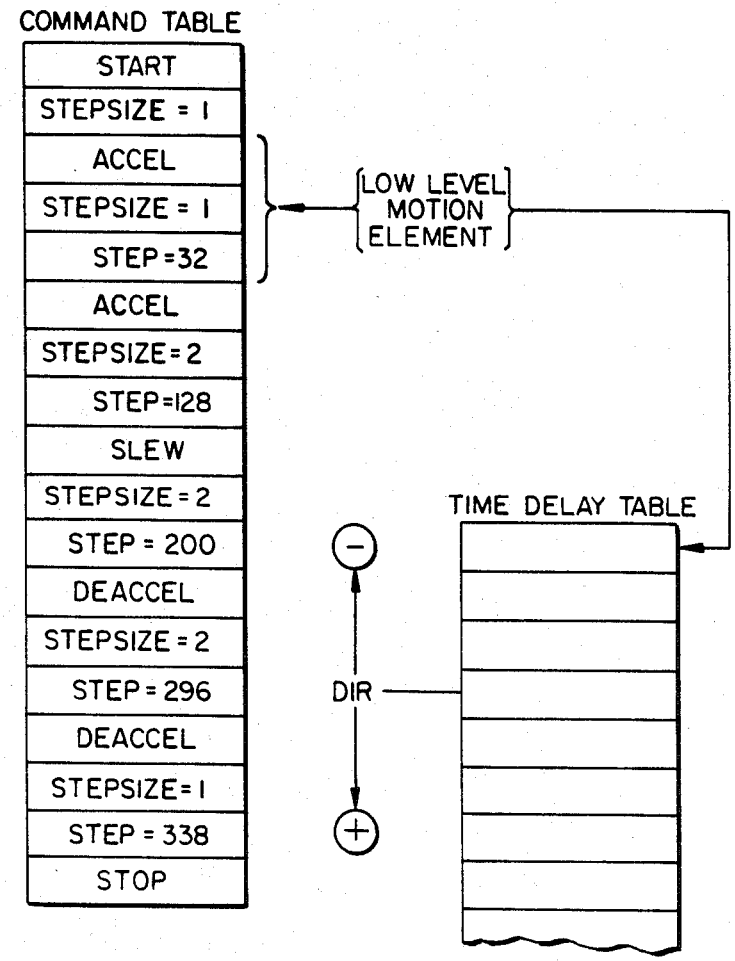
FIG._10.

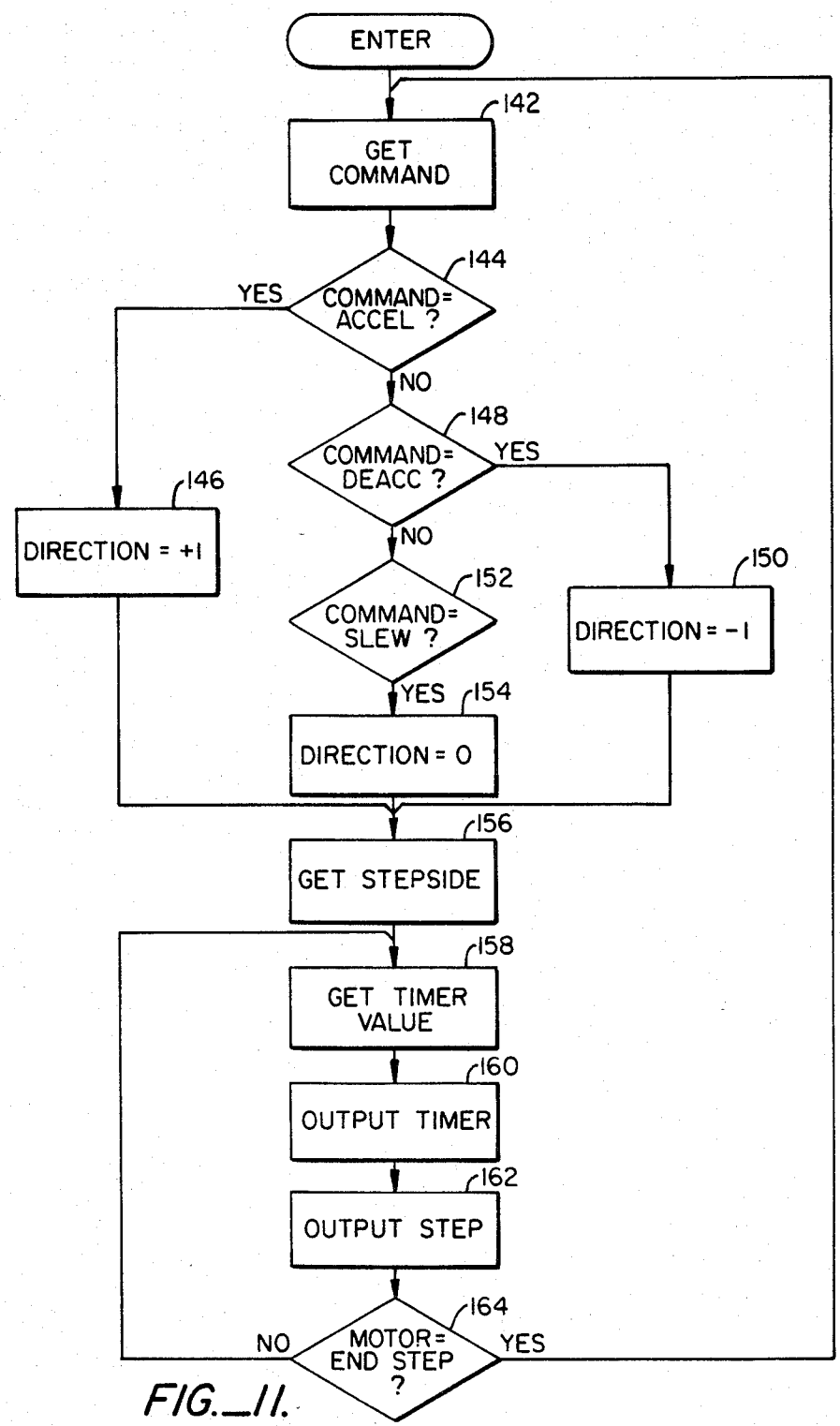
FIG._11.

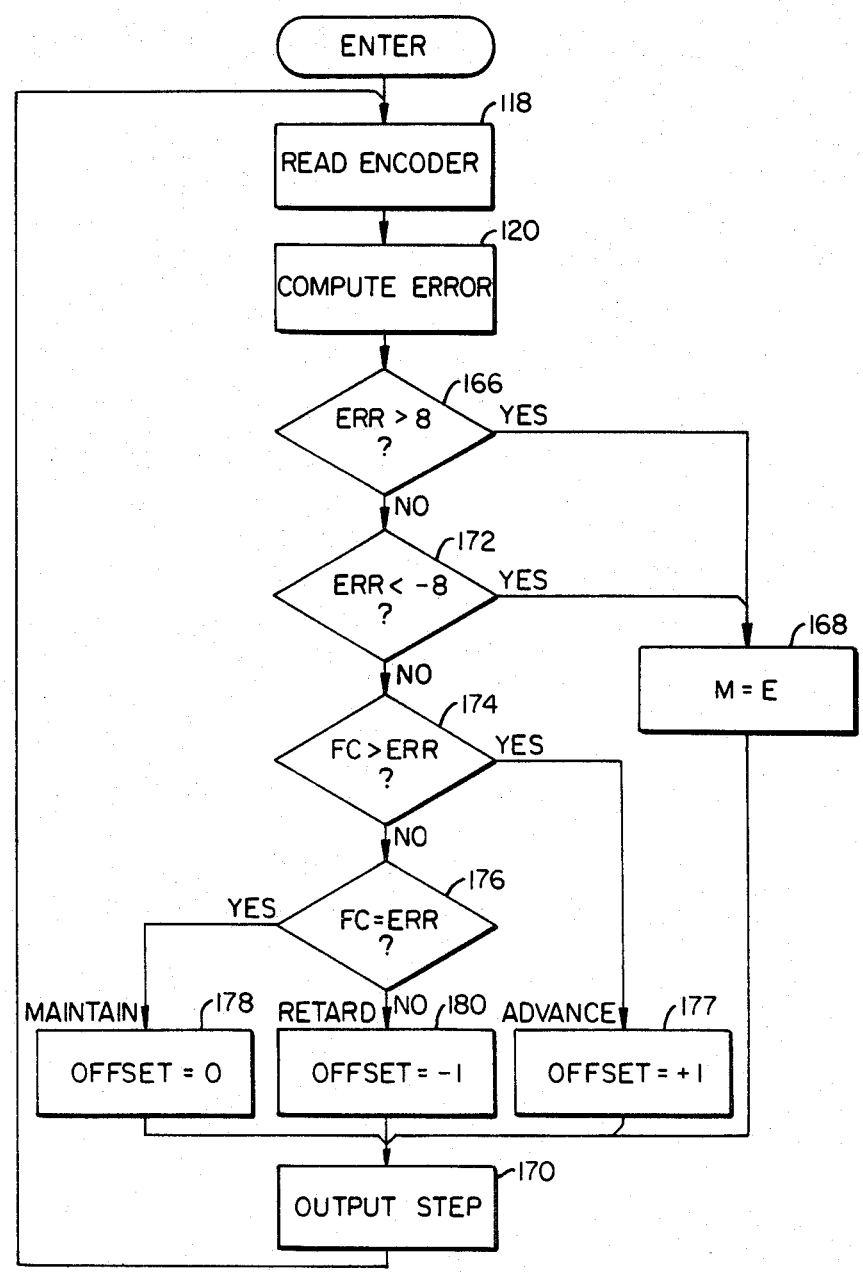
FIG._12.

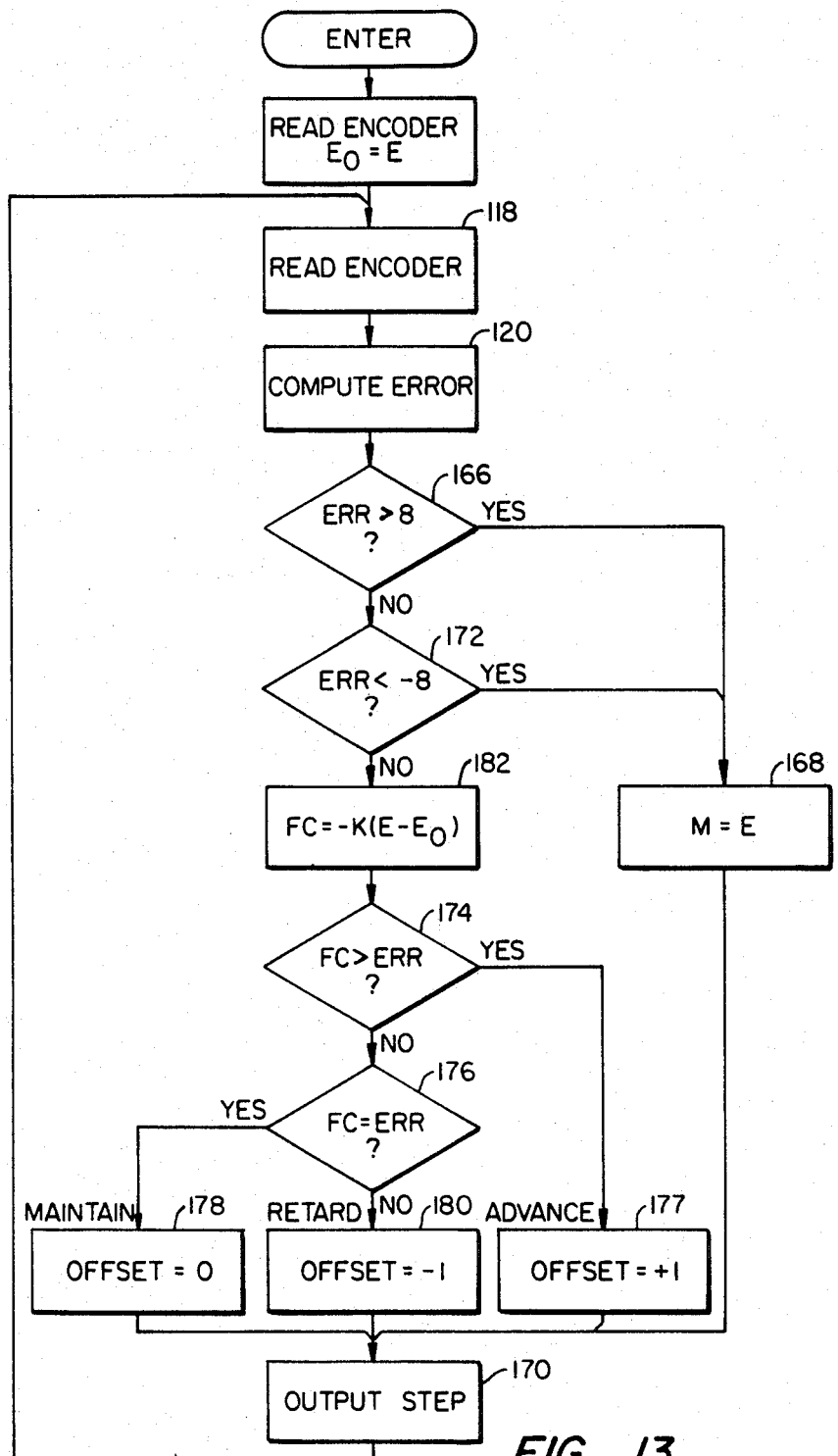
FIG._13.

CONTROL AND FORCE-SENSING METHOD AND APPARATUS FOR MOTORS

This invention was made with Government support under Grant Number ECS-8113808 awarded by the National Science Foundation. The Government has certain rights in this invention.

DESCRIPTION

1. Technical Field

The present invention relates generally to the control of robotic arms and, specifically, to a method and apparatus for controlling and force-sensing in motors used in robotic arms.

2. Background Art

In the current state of the robotic art, industrial robots are high-cost machines. Small electrical units range in cost from $30,000 to $50,000, while complete installations can range in cost from $100,000 to $150,000. In addition, such robots are of limited application because they typically operate on dead-reckoning. These robots lack force-sensing ability and force control capabilities which are necessary elements in an adaptive control application. Without adaptive control capabilities, such activities as parts-mating in assembly operations are difficult to perform.

Generally, commercially available industrial robots are position-controlled devices which can be commanded to move from one position to another. In applications such as paint spraying, dipping for investment castings, and materials handling in well-structured environments, such a position controlled capability is adequate. However, where it is desired to use a robot for assembly or fitting operations, the presently available commercial robots are generally not capable of sensing and controlling the forces that develop during encounters between the manipulated and the fixed objects.

In the past, typical solutions to this problem have involved the use of special jigs and fixtures designed and fabricated to locate parts and to provide the required compliance or "give" to allow the robot to perform the task despite some misalignment of the parts. Such jigs and fixtures typically triple the cost of a robot installation. Another solution involved the use of a compliant element at the wrist of the robot to absorb some of the errors caused by misalignment of the parts.

Current efforts in providing force-sensing and control include a D.C. servo approach. In such an approach, a conventional D.C. motor is driven by control circuitry. A tachometer, a position-encoder, and a strain gauge are all positioned on the D.C. motor shaft. From the strain gauge, a torque measurement is obtained, while from the position-encoder, a shaft position measurement is obtained. The tachometer provides a velocity measurement. Based upon these measured quantities, the control circuitry shapes the drive signal provided to the D.C. motor to control the same.

There are numerous drawbacks in such a configuration. The D.C. motor, typically having two to four poles, is costly and often requires substantial gear-reduction in order to produce the proper rotational velocity range which is suitable for robot operation. Additionally, brush and commutator wear limit the life of the motor to between 5,000 and 10,000 hours. Moreover, in order to provide position control capabilities, two feedback loops are required. Thus, the conventional D.C. servo approach has a high component count, a substantial gear-reduction requirement, a high motor cost, and reduced motor life.

In recent years, stepper motors have found increasing application in driving robotic arms. Customarily, stepper motors are driven by a train of pulses or steps. Each step causes the motor to rotate some fraction of one complete revolution, this fraction being a function of the number of poles in the motor. Thus, the angular position of a stepper motor is determined by the number of steps supplied to it.

Among the problems associated with the use of stepper motors in a robotics application is resonance at certain velocities and jerky movement a low rotational velocities.

There have been a number of stepper motor drive systems proposed for driving the motor with fractional steps. Generally, these proposals disclose a drive waveform which varies sinusoidally or trapezoidally and which is formed of a fixed number of fractional steps. One drawback of such drive configurations is that at high rotational velocities, the duration of each fractional step is too short to permit substantial control to be exercised over the motor on a fractional step basis.

SUMMARY OF THE INVENTION

The foregoing and other problems of prior art force-sensing and control methods and apparatus for driving a motor are overcome by the present invention. Means are provided for generating step size and step duration data as a function of the velocity at which the motor is desired to be rotated. For lower rotational velocities, smaller steps are designated whereas for greater rotational velocities, larger step sizes are designated. Means responsive to the step size data form a stair step drive waveform, for driving the motor, which varies at a frequency which determines the rotational velocity of the motor.

The step size data designate the number of fractional steps to be used to define a cycle of the drive waveform, while the step duration designates the time interval from fractional step to fractional step. The amplitude of each stairstep in the drive waveform is defined according to points selected from a sinusoidal-like curve. These points are spaced apart in phase on the curve by a phase interval which corresponds to a selected multiple of a base phase interval. The base phase interval as used herein corresponds to the smallest fractional step being used. The step size data specifies this selected multiple. The step duration data is selected to set the duration of each step and, hence, the rate of change from step to step. This determines the frequency of the variation of the stairstep drive waveform for a given step size and thereby determines the rotational velocity of the motor.

At lower rotational velocities, the phase interval between the selected points is chosen to be small so that the amplitude change from step to step is small. Thus, the phase interval is selected to be a low multiple of the base phase interval. As a result, the stairstep drive waveform resembles a sinusoidal-like curve which provides a smooth vibrationless rotation.

At higher velocities, the phase interval is selected to be a high multiple of the base phase interval so that the stairstep drive waveform resembles more of a pulse train. Because the phase interval is large, the amplitude change from step to step is also large. At higher velocities motor inertia damps the effect of using a large step size.

The step duration is selected for each different phase interval utilized so that the rate of change of the stairstep corresponds to the desired rotational velocity of the motor. Thus, the shape of the drive waveform supplied by the apparatus of the present invention is a function of the velocity at which it is desired for the stepper motor to rotate.

Means are provided for accelerating or decelerating the stepper motor from one velocity to another different velocity over a designated time period. A stairstep drive waveform is generated wherein the step size is selected according to the particular rotational velocities through which the stepper motor is to be driven. For each step in the drive waveform, step duration data is provided whereby the duration of each step is systematically changed. For acceleration, the step duration is decreased for each subsequent step, while, for deceleration, the step duration is increased with each subsequent step. At the commencement of the acceleration, a small step size is used and, hence, the amplitude defining points are spaced apart by a low multiple of the base phase interval. As the rotational velocity of the motor is increased, due to the systematic decrease in the step durations, a large multiple of the base phase interval is designated so that more widely spaced points along the sinusoidal curve are selected to define the step amplitudes of the drive waveform.

This modification of the stairstep sizes according to the current rotational velocity, and this change in step duration with each stairstep, is continued until the desired end velocity is reached. For deceleration, the above sequence is reversed. Thus, an operation resembling gear-shifting is implemented in this acceleration/deceleration feature.

Position indication means are disposed on the shaft of the stepper motor to provide an instantaneous indication of the actual angular position of the stepper motor shaft. This actual angular position information is utilized, to verify that the stepper motor shaft is in the desired position and to sense and control force when the shaft is displaced from its commanded position.

Means are provided for determining the torque being applied by the stepper motor shaft to a load disposed on the shaft through evaluation of shaft position information herein, torque and force are used synonymously. When the stepper motor shaft is commanded to a predetermined position, and the actual angular position information from the position indication means indicates that the stepper motor shaft is displaced by a certain amount from the commanded position, an applied force quantity is derived from the magnitude of the displacement. To do this, table means are provided which contain information relating angular displacement of the shaft to the quantity of force required to be applied to the shaft to cause such angular displacement. The table is utilized by applying, to the table, the difference between the commanded angular position of the shaft and the actual angular position of the shaft to derive the corresponding force which would cause such a displacement.

Because force sensing is accomplished in the present invention by way of examining positional information, force control is easily implemented by modifying the position of the stepper motor shaft until the desired shaft displacement; corresponding to the desired force, is obtained. Means are provided for examining the current shaft displacement and for modifying the shaft position until the desired displacement is achieved.

The above force control technique lends itself to a simple modification by which a compliance function can be implemented. In order to do this, the positional data corresponding to the force desired to be applied is made a function of the angle through which the shaft is turned in response to an externally applied load. The resulting quantity is then designated as the desired shaft angular position to which the shaft is to be rotated in response to the externally applied force.

Because the position indication means provides instantaneous angular position information, the angular position of the shaft can be evaluated for each step of the stairstep drive waveform. The capability of the present invention to force sense, by evaluation of positional data only, permits dynamic force control of the stepper motor in substantially all modes of operation. Because the step size and step duration of the stairstep drive waveform are changed according to the velocity at which the stepper motor shaft is to rotate, the duration of each step and the step size can be selected to be sufficiently large so that any force sensing, force control, and compliance determinations can be made even at such high rotation of velocities.

In the present invention no tachometers or strain guages are required. All force control and compliance control features are implemented by way of positional information. The result is a lower cost, more reliable, long lasting, yet more flexible method and apparatus for controlling a stepper motor, especially for robotic applications.

It is, therefore, an object of the present invention to provide a method and apparatus for driving a motor which provides a stairstep drive function wherein the step size and step duration are designated according to the velocity at which the motor shaft is to rotate.

It is another object of the present invention to provide a method and apparatus for accelerating a motor between a first rotational velocity and a second larger rotational velocity wherein means are provided for generating a stairstep drive waveform, wherein the step size designated is small for low rotational velocities and increases as the rotational velocity increases, while the step duration decreases for each subsequent step in the drive sequence.

It is still another object of the present invention to provide a method and apparatus for sensing the force applied by a motor shaft to a load which causes the shaft to be displaced from its commanded position, wherein table means are provided which relate angular displacement of the motor shaft, from a predetermined position, to the magnitude of load placed on the shaft, and further wherein the actual displacement of the shaft, when applied to the table means, provides the corresponding load magnitude which would cause such a displacement.

It is a still further object of the present invention to provide a method and apparatus for driving a motor wherein force control can be implemented by evaluating and modifying positional data.

It is another object of the present invention to provide a method and apparatus for driving a motor wherein the motor can be commanded to compliantly apply a force to a load by modifying positional information.

These and other objectives and features of the present invention will be more readily understood upon consideration of the drawings and the following detailed description of certain preferred embodiments of the present invention.

BRIEF DESCRIPTION OF THE DRAWINGS

FIG. 1 is a simplified block diagram of a robotic system in which the present invention can be utilized.

FIG. 2 is a simplified block diagram of a conventional D.C. servo motor.

FIG. 3 is a simplified block diagram of the present invention.

FIG. 4 is a more detailed block diagram of one embodiment of the present invention.

FIG. 5A illustrates a typical phase table by which points along a sinusoidal curve can be selected according to a predetermined multiple of a base phase interval.

FIG. 5B illustrates the relationship between the phase table addressing and the step size defining points along the sinusoidal-like curve.

FIG. 6 is a graph illustrative of the change in step size in the stairstep drive waveform as a function of the commanded rotational velocity.

FIG. 7 is a flow diagram illustrating the manner in which the step size and step duration data are utilized to drive a stepper motor.

FIG. 8A illustrates a typical prior art drive sequence for two robotic joints.

FIG. 8B illustrates the manner in which the step duration data can be coordinated between different joints to thereby smooth out differences in the degrees of movement of each joint.

FIG. 9 is an example of a curve relating step duration to step number for accelerating a stepper motor.

FIG. 10 illustrates an instruction sequence and timer value table by which a stepper motor can be accelerated.

FIG. 11 is a flow diagram illustrating the manner in which a stepper motor shaft can be moved from one position to another.

FIG. 12 is a flow diagram illustrating the manner in which force is controlled in the present invention.

FIG. 13 is a flow diagram illustrating the manner in which compliance is implemented in the present invention.

DETAILED DESCRIPTION

Referring to FIG. 1, a robot control structure of the present invention is shown. A command interpreter 10 receives instructions from an external source 12. The interpreter 10 evaluates each command received and then supplies instructions to a real time joint coordinator 13. This real time joint coordinator 13 is envisioned to be similar to an intelligent controller capable of coordinating a plurality of individual motor actuators 16. In FIG. 1, six such actuators 16 are shown, although the number actually used is limited only by the available technology for real time processing of instructions and evaluation of data.

Each motor actuator 16, in turn, controls an associated motor, such as a stepper motor 18.

For purposes of this detailed description, a discussion of one such motor actuator 16 and motor 18 combination will be discussed, it being understood that the discussion is similarly applicable to the other motor actuators and motor combinations.

Referring to FIGS. 2 and 3, the conventional D.C. servo and the motor control system of the present invention will now be contrasted. In FIG. 2, it can be seen that a control system 20 receives torque, position, and velocity information from appropriate sensors associated with the shaft 22 of a D.C. motor 24. Typically, the D.C. motor 24 has two to four poles and as such substantial gear reduction is required in order to obtain the desired range of rotation of velocities. The velocity information is supplied by a tachometer 26, while the position information is supplied by a shaft encoder 28. The torque information is supplied by a strain gauge 30. A load 32 is also shown connected to the D.C. motor shaft 22. In response to the above various information, the control system 20 of the conventional D.C. servo provides a driving signal to the motor 24 via amplifier 34.

In contrast, the present invention utilizes a brushless motor 36, preferably a stepper motor, a synchronous motor, or a brushless D.C. motor, which is driven by a plurality of phased drive signals applied to the motor 36 via drivers 38. A rotating magnetic field (RMF) control system 40 supplies these signals to driver 38. In turn, the rotating magnetic field control system receives position information from a shaft position encoder 42 which is disposed on the shaft 44 of stepper motor 36. Preferably the encoder 42 is an optical encoder. Shaft position encoder 42 can also be a potentiometer, a linear variable differential transformer, or any other means for measuring shaft position. Also shown located on shaft 44 is a load 46.

With a stepper motor, there are no brushes or commutators to wear down and, thereby, limit the life of the motor. Typically, there are eight to fifty poles providing for lower rotational velocities and therefore a reduction in the amount of gear reduction required.

In the configuration of the present invention, a single encoder 42 per stepper motor shaft 44 is utilized, all control and sensing functions being based upon the shaft encoder 42 data. The RMF control system 40, due in part to the manner in which the drive signals are supplied to the stepper motor 36, is capable of position control, rate control, acceleration and deacceleration control, trajectory control, force sensing, rate sensing, position sensing, and compliance generation without the need for additional information such as would be provided by the tachometer 26 and strain gauge 30 of the conventional D.C. servo.

General Configuration

Referring to FIG. 4, a conceptual functional block diagram of the present invention will now be described. For purposes of explanation, the stepper motor 36 will be assumed to have four motor coils: 48 and 50 which are associated with current sink 56, and coils 52 and 54 which are associated with current sink 58. Switches 60 and 62 can be transistor switches. Note that at any one time, these switches 60 and 62 connect one of the coils of each coil pair to the positive voltage supply plus V. Reversal of the switches 60 and 62 will cause the direction of the current, and hence the magnetic field, in the motor to reverse. Thus, the direction of the field in the motor is controlled by the particular coils connected to the plus V supply by switches 60 and 62. This permits current sinks 56 and 58 to be to unidirectional current sinks.

The magnitude of the current which is permitted to flow through current sinks 56 and 58 is controlled by digital to analog (D/A) converters 64 and 66, respectively. The D/A converters 64 and 66, in turn, are supplied with magnitude data from phase tables 68 and 70, respectively.

In FIG. 4, phase tables 68 and 70 are illustrated as physical blocks within the system. However, these phase tables can also be implemented within real time controller/processor (controller/processor) 14, with the data being supplied to D/A converter 64 and 66 via interface ports of the controller/processor 14. The system is illustrated in the format of FIG. 4 so as to simplify the conceptual understanding of the present invention.

Phase tables 68 and 70 are addressable by address buses 72 and 74, respectively. The phase tables provide for each address supplied thereto, magnitude data corresponding to a point along a sinusoidal-like curve. In the preferred embodiment of the present invention, these points are correlated with the addressing of the phase table so that each possible address of the phase table corresponds to a point from a set of points evenly spaced in phase along the sinusoidal-like curve. The reasons for such an arrangement will be discussed in subsequent sections of this application.

The addresses supplied to phase table 68 and 70 on address buses 72 and 74, respectively, originate from motor count register 76. The address from motor count register 76 is first incremented in adder 78 by a step size quantity, supplied from controller/processor 14. The address is then incremented in adder 80 by an offset quantity, supplied by controller/processor 14. The resulting address is then supplied to phase table 68 on address bus 72 to generate the magnitude for the current flow to coil pair 48 and 50.

The address on address bus 72 is incremented by adder 82 by a predetermined quantity in order to provide the required phase shift between the currents applied to each of the coil pairs. This address is then supplied on address bus 74 to phase table 70.

As is well-known in the art, proper phasing of the signals which are applied to the coils of a stepper motor generates the magnetic field and resulting torque that causes the shaft of the stepper motor to rotate.

The addresses supplied to phase tables 68 and 70 represent, in part, the commanded motor position. As can be seen from the figure, the address resident in motor count register 76 is supplied from address bus 72. That is, motor count register 76 is utilized to keep track of the last position to which shaft 44 of stepper motor 36 was commanded. As will be explained later, the address maintained in motor count register 76 is, in practice, much larger than the addresses required to access the phase tables.

Timer 86 provides control signals to motor count register 76 by which the address on address bus 72 is entered into motor count register 76. Preferably, timer 86 is programmable so that step duration data can be supplied thereto by controller/processor 14. This step duration data specifies the length of time over which motor count register 76 is to hold its current address before entering the up-dated address from address bus 72.

The address in motor counter register 76 is also supplied to controller/processor 14 for control purposes.

Referring now to controller/processor 14 it can be seen that this functional block provides the offset, step size, and step duration data discussed above. This functional block also controls the transistor switches 60 and 62 to specify which of the coils in the stepper motor coil pairs 48/50 and 52/54 are to be supplied with the drive waveforms.

Real time controller/processor 14 also provides initialization and control signals to motor count register 76 and shaft encoder 42.

As discussed above, shaft encoder 42 provides to the controller/processor 14 positional data indicating the actual angular position of stepper motor shaft 44. Additionally, the controller/processor 14 receives instructions from command interpreter 10 and communicates with memory 92, all over bus 90.

Command interpreter 10 receives instructions from the user 94 which can be a paper tape, an interactive keyboard, a computer or any of the other conventional user sources.

Therefore, in response to instructions from the command interpreter 10, controller/processor 14 generates a sequence of offset, step size and step duration data which are applied to adder 80, adder 78 and timer 86, respectively. In response thereto, a sequence of addresses are generated on address buses 72 and 74 and applied to phase tables 68 and 70, respectively. The phase tables 68 and 70 respond by each generating a sequence of magnitude data which are converted into phased stairstep drive waveforms by D/A converters 64 and 66, respectively. The waveforms are then applied to current sinks 56 and 58 to drive the stepper motor 36. It is to be understood that the current sinks can be operational amplifiers, bridge switching drivers, or other current control means.

Basic Motor Drive Method

In the present invention, the stepper motor 36 is driven by supplying to the stepper motor windings, or coils, currents which are changed approximately sinusoidally in time. The currents applied to each of the coils are shifted in phase with respect to one another. This produces a rotational magnetic field which causes the shaft 44 of the stepper motor 36 to rotate.

In the past, the driver waveform supplied to the coils of the stepper motor were typically a square-wavelike pattern, or full steps, with the period of the square wave affecting the velocity of rotation of the motor. Alternatively, a driver signal was supplied wherein the waveform was constructed of a predetermined number of fractional steps, each having the same amplitude. In this latter case, the step amplitude and number of steps used to construct each waveform cycle were the same for all velocities of the stepper motor rotation. Thus, at high rotational velocities, the duration of each step was exceedingly short. One such configuration is described in the U.S. Pat. No. 4,087,732 to Pritchard; issued May 2, 1978.

In the present invention, the number of fractional steps utilized to define a cycle of the drive waveform, and the duration of the steps used therein, are determined according to the velocity at which the stepper motor shaft 44 is desired to be rotated. Thus, for low rotational velocities, a large number of fractional steps are used to construct the drive waveform so that the drive waveform resembles a sinusoidal-like curve. As the desired rotational velocity increases, fewer steps are utilized and the step duration is changed to provide the proper rate of variation required for the desired rotation of velocity. At the higher rotational velocities, the drive waveform resembles a square wave or pulse train of full steps.

As a result, rotation at the lower velocities is much smoother than if a square wave driving pattern were used. At these lower velocities large changes in the amplitude of the drive waveforms are most noticeable, therefore the use of fractional stepping. Conversely, at higher speed, the abrupt changes in amplitude of the drive waveforms are less noticeable and thus a full step type drive waveform is acceptable. Driving with full steps at these velocities also provides a higher torque and higher operating efficiencies. Additionally, the selection of step size and step duration according to rotational velocity, permits the duration of each step to be maintained for a length of time which is long enough for all control operations and data evaluations to be completed for each step size used. This, in turn, permits precise control of the stepper motor for all velocities of rotation.

Phase Table/Step Size

In order to implement the variable step size and step duration drive waveforms, the phase tables 68 and 70 of FIG. 4 are utilized. It is understood that while two phase tables are shown, in practice one such phase table can be used with appropriate addressing and control. Also several sets of tables can be used, with each set defining a different drive pattern so that different drive waveforms can be generated by selecting the appropriate set of tables. FIG. 5 illustrates the organization of a typical phase table. For each address in the address column, there is an associated magnitude in the magnitude column. The magnitudes, when taken in sequence, vary approximately sinusoidally. The shape of the curve varies from a true sinusoid to accommodate for the motor's non-linear B-H curve. Note also that no two adjacent magnitudes are the same. For purposes of illustration, the addresses and magnitudes are given in decimal form, it being understood that in the actual implementation, these quantities will be preferably in binary form.

The quantities in the table of FIG. 5A are provided as an example and are based upon an assumed stepper motor which is rated at 200 full steps per revolution and a maximum of 32 steps per drive cycle. It is to be understood that a larger or smaller number of maximum steps per drive cycle, as well as stepper motors having a different number of full steps per revolution, are all contemplated to be suitable for use in accordance with the present invention.

Where a maximum of 32 steps is used to define one cycle of a drive waveform, the base phase interval is 11.25 degrees. Thus, the magnitudes given in FIG. 5A are from points along a sinusoidal-like curve which are spaced apart by 11.25 degrees. The magnitudes are sequentially arranged within the table so that if the table is sequentially addressed, a sequence of magnitudes will result which define a curve which varies approximately sinusoidally in time. From FIG. 5B, a portion of this sinusoidal-like variation can be seen. FIG. 5B also illustrates the association between the particular address and the magnitude data for the first ten addresses in the phase table.

By arranging the phase table in this manner, different stepper motor drive waveforms can be generated by selectively addressing the phase table. Phase intervals ranging from the smallest phase interval available, in this case 11.25 degrees or the base phase interval, to a multiple of the base phase interval, which produces full steps, can be obtained.

With respect to the 32 address phase table in FIG. 5A, full stepping can be generated by addressing every eighth address, i.e. 4, 12, 20, and 28, in the table. Conversely, sequential addressing of all of the locations within the table provides what is referred to as eighth stepping. If every other location were addressed in sequence, quarter stepping would be implemented. In quarter stepping, a sequence of 16 magnitudes per drive waveform cycle will be provided to define the amplitudes of the various steps of the drive waveform. The magnitudes will corresponds to points on a sinusoidal-like curve which are spaced apart in phase by 22.5 degrees. Likewise, if every fourth location were sequentially addressed in the phase table, half stepping will be implemented. Thus, by addressing every Nth address in the phase table, a drive waveform having a selectable step size can be generated where the amplitude of each step corresponds to one of a sequence of points along a sinusoidal-like curve where the points are spaced apart in phase from one another by N times the base phase interval.

FIG. 4 illustrates one manner in which such a selection of the addressing interval can be implemented. As discussed previously, the address on address bus 72 is modified by adder 78. Adder 78 increments the address supplied from motor count register 76 by a step size quantity. This step size quantity is specified by controller/processor 14. Where steps corresponding to the smallest phase interval are sought to be generated, the step size data supplied to adder 78 is set to be equal to 1. Similarly, if full steps are sought to be generated, the step size data would be set to 8, in the particular example. Moreover, by maintaining the step size data at a particular value, the drive waveform generated by the phase table, D/A converter, and current sink circuitry will continue to be defined by the selected step size. Changing the step size data will, therefore, immediately change the number of steps by which the drive waveform is defined.

By this arrangement, the "gear-shifting" technique, discussed above, can be easily implemented. For example, for very low rotational velocities, the step size would be set to 1; for intermediate rotational velocities, the step size can be set to 4; and for high rotational velocities, the step size can be set to 8.

Unlike the drive waveforms described in U.S. Pat. No. 4,087,732 discussed above, the step amplitudes of the drive waveforms of the present invention are not the same from step to step, but rather vary according to the size of the phase interval used.

Step Duration

As discussed above and shown in FIG. 4, timer 86, in response to step duration data from controller/processor 14, controls the amount of time over which motor count register 76 presents its current contents to the address bus. While the step size affects the number of steps required to define a cycle of the driver waveforms, it can be seen that the length of time that an address is presented by motor count register 76 will affect the length of time required to generate one such cycle. Thus, the duration specified for each step will determine the period of the drive waveform cycle and hence the frequency thereof. Similarly, if the step duration is maintained constant and the step size changed, the drive waveform frequency would also change. Recall that the frequency of the drive waveform determines the velocity at which the stepper motor shaft 44 will rotate.

FIG. 6 is a graphical illustration of selected drive waveforms which can be provided by the present invention for different rotational velocities. In this graph, the motor is driven at a low velocity at the left, at an intermediate velocity in the middle, and at a high velocity at the right. Note that the drive waveform corresponding to the low rotational velocity is defined by 16 steps per cycle. For the intermediate velocity drive waveform, eight steps per cycle are used. Finally, in the high velocity drive waveform, a square wavelike function is provided wherein 2 steps define one cycle of the drive waveform.

It has been found, in making the transition between these different step sizes, that the best results are had when the step size is changed on a multiple of the larger step size. That is, the change in step size should not be made in the middle of a step of the larger step size to which the change is to be made.

Joint Coordination

The inclusion of the timer 86 in the present invention provides an additional feature not present in the prior art. In one robotic system, when it is sought to move two joints of a robot at the same time and over the same time period, but with a different number of steps, the joint which must move the furthest governs the speed of the movement of the entire arm. Steps would be output to each joint at the same time, with the joint that was to be moved the furthest receiving a new step for every step output cycle. The joint to be moved a smaller distance would not receive a step for a number of step output cycles depending upon the distance over which it was to be moved. This produces a "beating" which results in jerky motions and noisy motors. See FIG. 8A wherein each arrow represents a step.

The provision of a programmable timer, such as timer 86 in FIG. 4, permits the step duration for each joint to be selected so that the steps for the particular joint can be distributed evenly across the alloted time period at an interval which is independent from that of the other joints. Referring to FIG. 8B, this relationship is illustrated. In FIG. 8A, the timing of the step outputs for two joints in prior robots is shown. Note that the step outputs for each joint coincide with one another, and that joint 2 does not receive a step at the first and fourth intervals.

FIG. 8B illustrates the step distribution in the present invention wherein time $T_2$ of joint 2 and time $T_1$ of joint 1 correspond to the step duration values supplied to the timer 86 associated with that joint. In this arrangement, the steps for each joint are not necessarily synchronized with the steps of the other joint. The result is a much smoother simultaneous motion of the two joints.

Operation

Referring to FIG. 7, a flow diagram of the drive waveform generation of the present invention is shown. Upon initial power-up, step 96, stepper motor 36 is provided with an initialization signal, step 98. This can be a drive signal which causes the motor to assume a "home" position, or perhaps a signal to energize the motor. Wait step 100 is provided to permit the motor 36 to stabilize. In step 102, the controller/processor 14 initializes shaft encoder 42 so that the current shaft position is used as a reference position for subsequent operations.

In step 104, the controller/processor 14 initializes motor counter register 76.

The controller/processor 14 initializes its internal memory so that the stored initial position of the shaft encoder is set to equal zero. See step 106. In step 108, the controller/processor enables the shaft encoder 42 to begin monitoring the position of the stepper motor shaft 44. In step 110, the controller/processor 14 initiates the timer 88 by providing step duration data. At this point, the system is ready to generate a drive waveform and to monitor the angular position of the shaft 44, all referenced to the position of the shaft as of step 98.

In step 112, the system is placed in a wait state until timer 88 has completed its timing cycle. After completion of the timing cycle, timer 88 is started again in conjunction with the reapplication to timer 88 of step duration data from controller/processor 14, see step 114. During the current timing cycle controller/processor 14 reads the output from shaft encoder 42 corresponding to the current angular position of the shaft; see step 118.

In the present invention, controller/processor 14 keeps track of the commanded position of the stepper motor by monitoring the contents of motor count register 76 and the number and size of the steps which have been output to the stepper motor 36. From this data, the theoretical change and position of the stepper motor 36 can be determined. For example, where a stepper motor requires 200 full steps per revolution, the shaft of the stepper motor will rotate through an 1.8 degree arc for each full step that is provided to the stepper motor. Similarly, where the drive waveform is formed of fractional steps, the stepper motor shaft moves a fraction of the 1.8-degree arc for each of the fractional steps provided which make up the waveform, and four full steps for each full cycle of the drive waveform. Thus, from the step size and number data and the motor count register contents, the controller/processor 14 can determine the theoretical position of the shaft 44 of the stepper motor 36.

In step 120, the controller/processor 14 then determines the error between the theoretical position, as determined by the controller/processor 14, and the actual position of the shaft 44, as indicated by shaft encoder 42. As will be discussed in later sections, this error is utilized by the controller/processor 14 to determine the force being applied by the shaft 44 to the load 46 and to control that force, as well as to provide a compliance feature.

In step 122, step size data is supplied by controller/processor 14 to adder 78. This step size data determines the number of steps by which each cycle of the drive waveform is defined. In step 124, controller/processor 14 applies offset data to adder 80. This offset quantity is used in the force control and compliance generating features of the invention to be discussed in detail in a later section.

The output of adder 80 is applied to address bus 72 and designates the location in the phase table 68 of the magnitude of the step to be applied to one set of coils of stepper motor 36. This is referred to in step 126. In step 128, the address supplied from adder 80 is incremented by a quantity equal to 8. This is to provide the appropriate phase shift of the drive waveform for application to the second pair of stepper motor coils. Recall that for purposes of explanation, a base interval of 32 was selected in the implementation of the phase tables 68 and 70, and that based upon such an interval, an address offset of eight will provide the offset in phase required for generating the rotating magnetic field in the motor coil. This phase offset between the drive waveforms for each coil set is provided by adder 82 as shown in FIG. 4.

In step 130, the addresses generated in steps 126 and 128 are operated upon for application to phase table 68 and 70. This particular operation is not shown in FIG. 4 in order to simplify the discussion. As a practical matter, it is preferable that the absolute theoretical position of the stepper motor shaft 44 be maintained in motor count register 76. To do this, motor count register 76 maintains a record of the full address provided by the incrementing operation in adder 78.

As discussed above, the phase table 68 and 70 are configured to define points on one cycle of a drive waveform. Thus only a limited number of bits are required to fully address the phase tables. Recall also that one cycle of the drive waveform will cause the stepper motor to rotate over a fraction of a full revolution. Thus the phase tables will be cycled through a substantial number of times to produce a single complete revolution of the stepper motor shaft. For example, where 200 full steps are required to cause the stepper motor to rotate one full revolution, 50 cycles of the drive waveform will be required to obtain one full rotation. Because the adder 78 increments the previous address from motor count register 76 by the step size quantity, the address on address bus 72 corresponds to the cumulative number of fractional steps output from the point in time, step 104, at which the motor count register 76 was initialized. A certain number of the least significant bits of the address indicate the current position in the phase table, while the remainder of the bits will indicate the number of full drive waveform cycles already generated. A masking operation of the address on address buses 72 and 74 is performed in step 130 to isolate those bits which indicate the current position in the table.

In the current example, the phase table provides 32 addressable magnitudes. Thus, a five bit binary number is required to address all 32 magnitudes. In step 132, the address on address bus 72 is ANDED with a binary number having all zeros except in the five least significant bits. Likewise, in step 134, the address on address bus 74 is ANDED with a binary number having all zeros except for the five least significant bits. These masked addresses are then used in the actual addressing of phase tables 68 and 70; see step 136. Upon the receipt of these masked addresses, the phase tables 68 and 70 output the corresponding magnitude data to D/A converter 64 and 66, respectively, in steps 138 and 140. D/A converters 64 and 66 transform the magnitude data into an analog signal for controlling current sinks 56 and 58, respectively.

After the magnitude data is output in steps 138 and 140, the system returns to step 112 and waits there until timer 88 has completed its timing cycle. During this time, the magnitude data will continue to be applied by phase table 68 to D/A converter 64 and by phase table 70 to D/A converter 66, thereby maintaining the desired step magnitude in the drive waveform.

When timer 88 has completed its timing cycle, the system proceeds out of step 112 and, again, to step 114. At this point, the controller/processor 14 can change the step duration to timer 88 so that the rate at which the driver waveform varies changes. Alternatively, the step size data can be varied. The system thus loops through steps 112 through 140 for each step generated in the drive waveform. The system is therefore capable of controlling the generation of the drive waveform for every step in the drive waveform.

Ramping

In changing the position of a stepper motor from one position to a second position, given a predetermined amount of time, it is often desirable to accelerate the stepper motor to a predetermined high velocity, to maintain that high velocity for a certain period of time, and then to decelerate the stepper motor so that at the end of the deceleration, the stepper motor is in the desired second position.

The present invention permits such an operation to be implemented simply and easily through the appropriate modification of the step size and step duration data being supplied to the adder 78 and timer 88, respectively, by the controller/processor 14 as instructed by command interpreter 10.

It can be shown that, for a given acceleration, a, a given maximum velocity $V_{max}$; a maximum time period $T_{max}$; a unit step length, $\Delta x$, total position change, x; and a time period $\Delta t$ associated with each of the unit step lengths $\Delta x$; and the total number of unit steps required; $x_{total}$, that $$\Delta t = \frac{\Delta t}{\sqrt{2ax}}$$

$$x_{total} = \frac{1}{2} V_{max} T_{max}$$

A derivation of these equations is provided in Appendix A.

FIG. 9 is a plot of the time delay, $\Delta t$ versus the number of unit eighth steps $\Delta x$ required to accelerate a stepper motor from zero velocity to a maximum velocity of 16,000 eighth steps per second with a desired acceleration of 256,000 eighth steps per second$^2$ within a maximum time $T_{max}$, of 1/16 seconds. Five hundred eighth steps are required in this example for the stepper motor to reach the desired maximum velocity. The curve specifies the step duration (time delay axis) for each step (step number axis) in the sequence of 500 eighth steps required to accelerate the stepper motor to the desired velocity in the specified time. For example, at step No. 100, the time delay or step duration supplied to timer 88 should be approximately 130 microseconds. While a continuous curve is defined by the plot in FIG. 9, it is to be understood that the step duration will, for practical purposes, be changed from step to step according to the size of that step. Thus, the change in the step duration data supplied to timer 88 will not be continuous, but rather in discrete steps.

In the preferred embodiment of the present invention, the acceleration between the first velocity and the maximum desired velocity is implemented using a particular step size which is selected according to the velocity through which the motor is passing at the time. Thus, for the lower rotational velocities, eighth steps would be used, but for higher rotational velocities, quarter steps, half steps or full steps will be used. In practice, the command interpreter 10 will generate a set of instructions which sequentially specify the step size, and the number of steps at that step size, for the range of velocities through which the stepper motor is to pass. The command interpreter 10 also provides a time-delay table which specifies for each of the steps being output the step duration to be supplied to timer 88. FIG. 10 provides an example of these tables. These tables can be stored in memory 92 and accessed by the controller/- processor 14 during the generation of each step in the drive waveform.

In the command table of FIG. 10, the instructions are arranged in groups called low-level motion elements. One such group is shown bracketed in the figure and includes a step size quantity, a specification as to whether the motion will be an acceleration, a deceleration, or a constant velocity or slew, as well as the number of steps to be output at the particular step size. Thus, for the bracketed low-level motion element, the activity is to be an acceleration, the step size used is designated to be equal to one, corresponding to eighth steps, and 32 steps are to be output at this step size. The time delay table contains the timer values for each of the steps to be output in the acceleration activity. Thus, for the bracketed low-level motion element, the time delay table will include a time-delay value for each of the 32 steps to be generated in accordance with the particular low-level motion element.

The mode information of each low level motion element; i.e., acceleration, slew or deceleration, indicates in which direction the time delay table is to be read. Thus, for an acceleration mode, the time delay table would be read in descending order, while for a deceleration mode, the time delay table would be read in a reverse or ascending order. For a slew mode, the current time delay table entry would continue to be read until the slew mode was completed.

By arranging the instructions into low-level motion elements, as in FIG. 10, the transitions between different step sizes can be controlled so that the transitions will occur on an even multiple of the larger step size.

FIG. 11 illustrates the manner in which the real time controller/processor 14 executes the instructions contained within the command table and time delay table. In step 142, the controller/processor gets the first command from the command table. In step 140, the command is examined to determine whether an acceleration is called for. If such is the case, step 146 will be executed in which the controller/processor 14 will be instructed to read the timer table in a descending order. If, on the other hand, the command is a deceleration command, the controller/processor in step 148 will proceed to step 150 and indicate that the time delay table is to be read in an ascending or reverse direction. If the command is a slew command, as determined in step 152, step 154 will be executed which indicates that the current value of the time delay table is to be read for all of the steps being currently generated.

After a determination of the type of activity is made, step 156 is executed in which the instruction designating the step size is examined. Next, step 158 is executed wherein the time delay table is read according to the type of activity being generated. The timer value for the particular step being generated is output from the time delay table to timer 88, in step 160. The step size data is output to adder 78 in step 162. In step 164, a determination is made whether all of the steps in the particular low-level motion element have been output. If not, the controller/processor returns to step 158 in which the retrieval of the next timer value and the output of the timer value and step size data are continued.

If, on the other hand, all of the required steps for the low-level motion element have been produced, the controller/processor returns to step 142 in which the next low-level motion element is executed. This process continues until the command table is completely executed.

Force Sensing

The present invention senses the amount of force being applied by the stepper motor shaft 44 to the load 46 by evaluating the difference between the actual angular position of the shaft and the theoretical or commanded position of the shaft 44. It has been found that there is a repeatable relationship between the deflection of a stepper motor shaft, from its commanded position upon the application of a load, versus the magnitude of the load applied. Thus, by examining the difference between the actual angular position of the shaft 44 and the commanded position of the shaft, one can refer to this relationship to determine what applied force is required for such a degree of deflection. One way to obtain definition of such a relationship is to empirically determine the same by commanding the stepper motor shaft to a particular position, applying a known load to the shaft, and measuring the angular deflection of the shaft using a shaft encoder. The relationship, thus defined can then be placed in tabular form in memory 92, for example, so that for a given deflection quantity, the table can be read to yield the corresponding force required to obtain such a deflection.

In practice, the stepper motor shaft will be driving a moment arm, wherein the load is disposed at the end of the arm. The force table would, therefore, be generated using the moment arm and load configuration.

Returning to FIG. 7, recall that for each new step in the drive waveform, the output of the shaft encoder 42 is read in step 118 and the error between the commanded position, M, and the actual position, E, is determined in step 120. Therefore, for each step generated in the drive waveform, the present invention is capable of determining the force being applied to the load by the stepper motor shaft 44. The controller/processor 14 is therefore capable of sensing the amount of force applied for each step in the drive waveform.

Referring to FIG. 12, the manner in which the controller/processor 14 implements a force controlling operation is illustrated. Steps 118 and 120 are the same as those found in FIG. 7. In the force control mode, controller/processor 14 is typically supplied with the following information from the command interpreter 10: an indication that a force mode is to be entered into, the step duration value for use in timer 88 during the operation, the amount of force to be applied, and the increment by which the position of the shaft 44 is to be changed in an attempt to increase or decrease the force actually being applied.

It will be noted that the flow diagram of FIG. 12 is composed of two major sections. The first section involves step 166 in which it is determined whether the motor itself has slipped. Slippage is indicated when the difference in commanded versus actual shaft position is greater than one quarter of a full step. In the context of the example in this discussion, such a condition is indicated by a positional difference greater than 8. Typically, when an external force, greater than the available force from a stepper motor, is applied, the motor will slip. If such is the case, the motor will be commanded to its actual present position and the system will try to build up the commanded force from that point. This re-initialization occurs in step 168 where the commanded position is made equal to the encoder position, and in step 170 where the new commanded position is output.

The remainder of the flow diagram deals with the force control operation. In step 174 the controller/processor 14 references the force table stored in memory 92 to obtain the required deflection for the desired force. If in step 174, the error or difference between the actual and commanded position is less than the required deflection, step 177 is executed in which the position of the motor is advanced by one increment.

This advancing of the stepper motor position is implemented by adder 80 shown in FIG. 4. Recall that the address supplied from motor count register 76 to phase tables 68 and 70 is incremented by adder 80 according to an offset supplied by controller/processor 14. By this action, the commanded position of the stepper motor 36 is advanced by a predetermined amount. After this new commanded position is output in step 170, the controller/processor 14 returns to step 118 and repeats the motor slippage determination steps and examines the new force quantity.

If in step 174 the positional difference is found to correspond to the desired deflection quantity in 176, the value of the offset supplied to adder 80, FIG. 4, is equal to zero. This offset is supplied to adder 80 in step 178.

If, on the other hand, in step 176, the positional error was found not to be equal to the displacement which corresponds to the desired force, an excessive force is indicated. Step 180 is then executed in which the commanded motor position is retarded by the specified increment.

It is to be understood that the above force control procedure can be performed within the time period required to generate a single step. Thus, force control can be implemented by the present invention for each step in the drive waveform that is provided to stepper motor 36. At this point, the significance of the variability of the step size as a function of the rotational velocity of the motor becomes apparent. If the same number of fractional steps were utilized to form the drive waveforms for higher rotational velocities as for lower rotational velocities, there would be insufficient time during the generation of each step in the waveform to perform all of the operations required for force control. Thus the ability to adjust the step size is desirable.

As described above, the force control procedure utilizes a force table which is derived experimentally from an actual stepper motor. As such, it has been found that there is some variation of the displacement versus force relationship depending upon the actual shaft angle of the stepper motor. In order to remedy this situation, the curves can be linearized by use of non-linear correction tables based upon shaft angle and sensed error.

By modifying the drive waveform provided in the phase table so as to principally reduce the current drive to the motor, increased force sensitivity can be achieved. Reduction of the drive current in this manner reduces the stiffness of the motor which, in turn, permits a force, which is applied to the shaft, to cause a greater change in position of the shaft. This, in turn, provides a greater resolution of position change versus applied force, thereby providing greater force sensitivity.

Programmed Compliance

As discussed earlier, it is desirable in a robotic system to provide programmed compliance in the joints of the robot. Such compliance is desirable when assembly operations are required involving parts mating. In the present invention, compliance can be implemented by adding another step to the flow diagram of FIG. 12. The resulting flow diagram is shown in FIG. 13. The added step 182 is disposed between steps 172 and 174. The effect of this step 182 is to equate the desired force quantity, which is being examined in steps 174 and 176, to the product of a spring constant quantity and the difference between the current actual position and the original actual position. The remainder of the flow diagram and the operation of the steps therein is identical to that of the flow diagram of FIG. 13 and the force control operation.

With the addition of step 182 into the flow diagram of FIG. 13, the adjustments made in steps 174 and 176 become functions of the change in position of the stepper motor shaft 44 as a result of the previous commanded motor position and a spring constant. This spring constant is supplied in the command table from the command interpreter 10.

Thus, in operation, a compliant feature can be implemented in the present invention wherein compliance is controlled for every step in the driver wave form that is supplied to the stepper motor 36.

It is to be understood that any compliance function can be implemented in the above manner by equating FC in step 182 to the desired compliance function. Thus $-K(E-Eo)$ can be replaced with $f(E-Eo)$, where f is any function of $E-Eo$.

A motor suitable for use in the present invention is a pulse motor manufactured by Nippon Corporation of Japan and bears Model Number PH55-B2. A suitable shaft encoder would be preferably an optical encoder with a resolution consistent with the maximum number of fractional steps contemplated for defining one cycle of the drive waveform. An optical encoder manufactured by Dynamics Research of Wilmington, Va., Model 720 is one such encoder which provides 800 counts per revolution. In order to derive the required 16 bit precision from this encoder, a standard quadrature decoder circuit was used in conjunction with a 16-bit up/down counter.

The controller/processor 14 can be microprocessor controlled. Preferably, the controller/processor 14 should be capable of performing 16-bit arithmetic at high speed so that the various shaft position determinations and step size and duration data generation can be accomplished during the generation of each fractional step in the waveform.

The command interpreter 10 can be a general purpose microcomputer such as those manufactured by the Apple Computer Corporation of Cupertino, Calif. or a dedicated processor. As discussed above, the command interpreter 10 interprets the various commands supplied by the user to supply the controller/processor with low level motion elements or instructions. Based upon these instructions, the controller/processor 14 implements the real time control over the stairstep waveform generation by which the stepper motor 36 is driven and controlled.

The present invention, described herein, can be utilized in a higher order system wherein the step duration, step size, torque and compliance values utilized are controlled and specified by the higher order system as a function of time. In such a configuration, these values can easily be changed independently of each other for each joint so that a different function can be implemented at each joint. For example, the torque value for each joint can be changed cooperatively to provide a force/torque vector which can be related to the work space coordinates.

The terms and expressions used herein are terms of description and not of limitation, and there is no intention, in the use of such terms and expressions of excluding equivalents of the features shown and described, or portions thereof, it being recognized that various modifications are possible within the scope of the invention claimed.

APPENDIX A

If we assume a constant acceleration, a, then the following equations relate acceleration, velocity, position, and time.

$$x = \tfrac{1}{2} a t^2 \qquad (1)$$

$$v = at \qquad (2)$$

We can solve (1) for t to obtain $$t = \sqrt{\frac{2x}{a}} \qquad (3)$$

Now, substituting (3) into (2), we obtain $$v = \sqrt{2ax} \qquad (4)$$

Now, we know that v = dx/dt or for small dt, $$v = \Delta x / \Delta t \qquad (5)$$

So, substituting (4) into (5) and solving for $\Delta t$, we obtain $$\Delta t = \frac{\Delta x}{\sqrt{2ax}} \qquad (6)$$

Finally, it is necessary to derive an expression for the total number of ⅛ steps to reach the desired velocity with the commanded acceleration. If the full speed velocity $V_{max}$ is reached in $T_{max}$ seconds, then from (2)

$$a = V_{max}/T_{max} \qquad (7)$$

So, substituting (7) into (1) we obtain $$X_{total} = \tfrac{1}{2} V_{max} T_{max} \qquad (8)$$

As an example, if we assume a desired acceleration of 256,000 eighth steps/sec$^2$, and a maximum velocity of 16000 eighth steps/sec and a maximum time of 1/16 seconds, then it will take 500 eighth steps to reach full speed.

We claim:

1. A method of measuring a torque being applied by the shaft of a brushless motor to a load which is driven by the shaft of the brushless motor, comprising the steps of
    calibrating the brushless motor for angular displacement versus magnitude of applied load to form a calibration table;
    commanding the brushless motor to a designated angular position;
    measuring the actual angular position of the shaft of the brushless motor;
    determining the angular displacement between the commanded and the actual positions; and
    converting the angular difference into a torque quantity by obtaining, from the calibration table, the torque quantity which corresponds to the angular difference.

2. The method, as recited in claim 1, wherein the calibration step includes the steps of
    applying a predetermined position command to the brushless motor when the brushless motor shaft is unloaded;
    determining the actual angular position of the shaft corresponding to the unloaded brushless motor shaft;
    loading the shaft with a first predetermined load;
    determining the difference in actual angular position of the shaft which corresponds to the first predetermined load;
    applying additional loads and determining the corresponding difference in actual angular positions; and
    forming a calibration table relating load versus difference in actual angular position.

3. The method, as recited in claim 1, wherein desired displacement data are provided which correspond to the desired force to be applied, further including the steps of
    a. comparing the angular displacement to the desired displacement data;
    b. incrementing the commanded position by a predetermined amount in the direction of desired change; and
    c. repeating steps (a) and (b) until the actual angular displacement is substantially equal to the desired displacement data.

4. A method of measuring a torque being applied by a shaft of a brushless motor to a load which is driven by the shaft of the brushless motor, wherein the brushless motor has been calibrated for angular displacement versus magnitude of applied load to form a calibration table, the method comprising the steps of
    commanding the brushless motor to a designated angular position;
    measuring the actual angular position of the shaft of the brushless motor;
    determining the angular difference between the commanded and the actual positions; and
    converting the angular difference into a torque quantity which corresponds to the angular displacement.

5. The method of claim 4, wherein the position of the brushless motor is changed by way of a series of steps in a drive waveform in which each step commands the brushless motor to a different position, further including the step of repeating the measuring and determining steps for each step in the drive waveform so that a dynamic force measurement is obtained.

6. The method of claim 4, wherein in the commanding step, the brushless motor is commanded to a position which corresponds to the application of a desired amount of force as defined by the calibration table, further including the steps of
    repeating the measuring and determining steps; and
    further determining whether the angular difference is greater than the desired amount of force, so as to detect whether an excessive force is being applied by the shaft of the brushless motor to the load.

7. The method of claim 4 wherein the brushless motor has been calibrated for angular displacement versus magnitude of applied load for a number of different drive current levels, and futher wherein the commanding step further includes the step of selecting a particular drive current; and further wherein the converting step includes the step of the selecting the torque quantity which corresponds to the angular displacement for the particular drive current being used, so that force measurement with a particular sensitivity can be obtained.

8. The method of claim 1 wherein the brushless motors are stepper motors.

9. The method of claim 4 wherein the brushless motors are stepper motors.

* * * * *